US008891546B1

(12) United States Patent
Frenkel et al.

(10) Patent No.: US 8,891,546 B1
(45) Date of Patent: Nov. 18, 2014

(54) PROTOCOL SPLITTER

(71) Applicant: Waterfall Security Solutions Ltd., Rosh Ha'ayin (IL)

(72) Inventors: Lior Frenkel, Misgav Dov (IL); Andrew Ginter, Calgary (CA); Tomer Maor, Ness Ziona (IL)

(73) Assignee: Waterfall Security Solutions Ltd., Rosh Ha'ayin (IL)

( * ) Notice: Subject to any disclaimer, the term of this patent is extended or adjusted under 35 U.S.C. 154(b) by 0 days.

(21) Appl. No.: 14/262,748

(22) Filed: Apr. 27, 2014

(51) Int. Cl.
*H04J 1/16* (2006.01)
*H04L 29/06* (2006.01)
*H04L 12/28* (2006.01)

(52) U.S. Cl.
CPC .................. *H04L 63/1441* (2013.01)
USPC ............................ 370/419; 370/252; 370/282

(58) Field of Classification Search
USPC .......................................... 370/252, 282, 419
See application file for complete search history.

(56) References Cited

U.S. PATENT DOCUMENTS

| 6,853,648 | B1* | 2/2005 | Krstanovski et al. ......... 370/465 |
| 7,649,452 | B2 | 1/2010 | Zilberstein et al. |
| 7,992,209 | B1 | 8/2011 | Menoher et al. |
| 8,266,689 | B2 | 9/2012 | Menoher et al. |
| 8,353,022 | B1 | 1/2013 | Menoher et al. |
| 2011/0252116 | A1 | 10/2011 | Menoher et al. |
| 2012/0331097 | A1 | 12/2012 | Menoher et al. |
| 2013/0097283 | A1 | 4/2013 | Menoher et al. |

OTHER PUBLICATIONS

IEC 60870-5 Communication Protocol, 6 pages, Jan. 23, 2014 (http://en.wikipedia.org/wiki/IEC_60870-5).
A DNP3 Protocol Primer, Revision A, 8 pages, Mar. 20, 2005.
Modbus Application Protocol Specification, V1.1b3, 50 pages, Apr. 26, 2012.
IEC 60870-6 Protocol, 5 pages, Feb. 21, 2014 (http://en.wikipedia.org/wiki/IEC_60870-6).
Waterfall Security Solutions Ltd., Unidirectional Security Gateways, 3 pages, year 2012.

* cited by examiner

*Primary Examiner* — John Pezzlo
(74) *Attorney, Agent, or Firm* — D. Kligler I.P. Services Ltd.

(57) ABSTRACT

Communication apparatus includes at least first and second communication interfaces, configured for digital communication with first and second nodes. At least one processor is coupled between the communication interfaces, and is configured, upon receiving a message from one of the first and second nodes that is directed to the other of the first and second nodes, to carry out the following actions: when the message contains a command, to convey the command to the other of the first and second nodes; when the message contains status information, to convey the status information to the other of the first and second nodes; when the message contains a response to a command, to discard the response; and when the message contains a query, to block the query from reaching the other of the first and second nodes.

16 Claims, 4 Drawing Sheets

PROTOCOL SPLITTER

FIELD OF THE INVENTION

The present invention relates generally to digital communications and control, and particularly to systems and methods for secure communications.

BACKGROUND

In a computer network handling sensitive data, portions of the network may be connected by hardware-enforced unidirectional channels (also referred to as one-way data links). The term "hardware-enforced unidirectional channel" is used in the context of the present patent application and in the claims to refer to a communication link that is physically configured to carry signals in one direction and to be incapable of carrying signals in the opposite direction. Hardware-enforced unidirectional channels may be implemented, for example, using Waterfall® systems, which are manufactured by Waterfall Security Solutions, Ltd. (Rosh HaAyin, Israel). The Waterfall system provides a physical one-way connection based on fiberoptic communication, using an underlying proprietary transfer protocol. When a transmitting computer is connected by a Waterfall system (or other hardware-enforced unidirectional channel) to a receiving computer, the receiving computer can receive data from the transmitting computer but has no physical means of sending any return communications to the transmitting computer.

Hardware-enforced unidirectional channels may be used to prevent data either from entering or leaving a protected facility. For example, confidential data that must not be accessed from external sites may be stored on a computer that is configured to receive data over a hardware-enforced unidirectional channel and has no physical outgoing link over which data might be transmitted to an external site. On the other hand, in some applications, the operator of the protected facility may be prepared to allow data to exit the facility freely via a hardware-enforced unidirectional channel, while preventing data from entering the facility in order to thwart hackers and cyber-terrorists.

In this latter category, for example, U.S. Pat. No. 7,649,452, whose disclosure is incorporated herein by reference, describes protection of control networks using a one-way link. As described in this patent, a method for monitoring a process includes receiving a signal from a sensor that is indicative of a physical attribute associated with the process and transmitting data indicative of the received signal over a one-way link. The transmitted data received from the one way link are used in monitoring the process. The method is described in the patent particularly in the context of Supervisory Control And Data Acquisition (SCADA) systems. A SCADA system receives monitoring data from the monitored facility via a one-way link. The SCADA system is unable to transmit any sort of data back to the monitored facility (although a separate, open-loop connection may be provided for this purpose), and therefore cannot be used as the base for an attack on the facility.

SUMMARY

Embodiments of the present invention provide apparatus and methods for automatically protecting bi-directional communication exchanges.

There is therefore provided, in accordance with an embodiment of the present invention, communication apparatus, which includes at least one first communication interface, configured for digital communication with a first node and at least one second communication interface, configured for digital communication with a second node. At least one processor is coupled between the at least one first communication interface and the at least one second communication interface, and is configured, upon receiving a message from one of the first and second nodes that is directed to the other of the first and second nodes, to carry out the following actions: when the message contains a command, to convey the command to the other of the first and second nodes; when the message contains status information, to convey the status information to the other of the first and second nodes; when the message contains a response to a command, to discard the response; and when the message contains a query, to block the query from reaching the other of the first and second nodes.

In a disclosed embodiment, the first node is contained in a protected network, and the at least one processor is configured, upon receiving the query from the second node, to convey a response to the second node rejecting the query.

In some embodiments, the at least one first communication interface includes a first hardware-enforced unidirectional channel from the at least one processor to the first node and a second hardware-enforced unidirectional channel from the first node to the at least one processor.

In one embodiment, the apparatus includes at least one replication server, which is coupled at least to the first protocol splitter and is configured to receive and maintain a replica of data transmitted by the second node via the second protocol splitter and using the replica, to respond to queries from the first node with respect to the data, wherein the first protocol splitter is configured, upon receiving queries directed to the second node from the first node, to forward the queries to the replication server and to forward responses to the queries from the replication server to the first node.

The processor is optionally configured, when the message contains a response to a command, to process the response before discarding the response.

There is also provided, in accordance with an embodiment of the present invention, a system for secure communication between first and second nodes. The system includes first and second protocol splitters, each of the protocol splitters configured to transmit and receive digital communications to and from a respective one of the first and second nodes. The system also includes a first hardware-enforced unidirectional channel from the first protocol splitter to the second protocol splitter and a second hardware-enforced unidirectional channel from the second protocol splitter to the first protocol splitter.

In some embodiments, the system includes at least one replication server, and may include a first replication server coupled to the first protocol splitter and a second replication server coupled to the second protocol splitter.

There is additionally provided, in accordance with an embodiment of the present invention, a method for communication, which includes coupling a protocol splitter into a communication path between a first node and a second node. Upon receiving a message at the protocol splitter from one of the first and second nodes that is directed to the other of the first and second nodes, the following actions are carried out: when the message contains a command, conveying the command to the other of the first and second nodes; when the message contains status information, conveying the status information to the other of the first and second nodes; when the message contains a response to a command, discarding the response; and when the message contains a query, blocking the query from reaching the other of the first and second nodes.

The present invention will be more fully understood from the following detailed description of the embodiments thereof, taken together with the drawings in which:

DETAILED DESCRIPTION OF EMBODIMENTS

Although hardware-enforced unidirectional channels are effective in improving communication security, most communications protocols are bi-directional. For example, relational database access protocols allow users or applications to issue query requests, to which the database responds with the data which matches the query. Industrial control protocols allow users or applications to issue commands to control devices in order to perform actions such as starting motors or opening valves, to which the control devices respond with status information indicating whether the requested action could be carried out.

There are a number of risks associated with permitting bi-directional communications into and out of protected facilities. One risk is that if malware has somehow been introduced into the protected network (possibly by insider collaboration), communications back into the protected network could be used to trigger an attack. For example, the malware could cause a computer in the facility to recognize a certain string communicated back into the protected network as a command to initiate some harmful action. Another risk is that an attacker might use the communications channel into the facility to cause unsafe or unreliable conditions in the protected network, by means of a buffer overflow attack, for instance. Such an attack could then be used to introduce remote control malware into the protected network, and provide an attacker with the means to interactively explore and sabotage the protected network.

Embodiments of the present invention that are described hereinbelow address these risks by enabling certain, specific bi-directional communication exchanges with a protected network, while inhibiting the introduction and operation of remote-control malware into the protected network. These embodiments are built around a protocol splitter, which can be interposed between a protected network and an external network and is configured to support a certain bi-directional protocol or protocols. The splitter terminates the message streams reaching it from both networks, and applies novel decision logic in order to pass through, block, or otherwise respond to the contents of different, predefined message types provided by the protocol.

In some embodiments, the protocol splitter is implemented in apparatus that includes at least two communication interfaces, configured for digital communications: one connected to a node in the protected network, for example, and the other to a node that may be in the external network. A processor coupled between these communication interface receives messages directed between these nodes, and depending on the message type carries out the following actions:

When the message contains a command from one node, the splitter conveys the command through to the other node.

Likewise, when the message contains status information, the splitter conveys the status information through to the other node.

When the message contains a response to a command, the splitter discards the response (although the processor may optionally process the response before discarding it).

When the message contains a query, the splitter blocks the query, although in some cases it may reply to the transmitting node that the query has been rejected.

In effect, the splitter divides the bi-directional connection between the nodes into two separate, independent unidirectional connections. Consequently, even if a piece of malware was embedded into the communications stream transmitted into the protected network (through the splitter or otherwise), and the malware managed to compromise one of the computers inside the protected network, the splitter will frustrate attempts by the attacker to exploit the malware. Because it blocks command responses and queries, the splitter prevents the malware from finding a path back out to the external network in order to report remote control outputs to the attacker. As a result, the attacker will in all likelihood be unable to propagate the malware further into the protected network and will thus be prevented from causing serious and long-lasting damage. (Of course, a malicious insider within the protected network could assist the attacker in this regard, but protection against insider attacks is beyond the scope of the disclosed embodiments.)

Splitters in accordance with embodiments of the present invention may be deployed in a variety of configurations. It is useful in many applications for at least one of the communication interfaces of the splitter to comprise a pair of hardware-enforced unidirectional channels, for example, one channel into and the other channel out of the protected network. Alternatively, in some applications, the protocol splitter can be effectively used in conjunction with conventional two-way interfaces, without any hardware-enforced unidirectional channels.

Additionally or alternatively, a protocol splitter may be used in conjunction with a replication server, which receives and maintains a replica of data transmitted by one of the nodes (typically the node in the protected network) to the splitter, and can then use this replica to respond to queries with respect to the data. Upon receiving queries from the other node, the splitter may forward these queries to the replication server for response. The splitter then forwards the responses to the queries from the replication server to the requesting node.

In some embodiments, a pair of protocol splitters may be used for enhanced security between a pair of endpoint nodes. Each of the splitters is coupled to transmit and receive digital communications to and from a respective endpoint node. The two splitters are typically connected to one another by a pair of hardware-enforced unidirectional channels, oriented for opposite directions of transmission.

Although the embodiments described hereinbelow relate, by way of example, to certain specific types of networks, applications, and protocols, the principles of the present invention are by no means limited to these example scenarios and may similarly be applied in other suitable communication applications.

Figure 1:
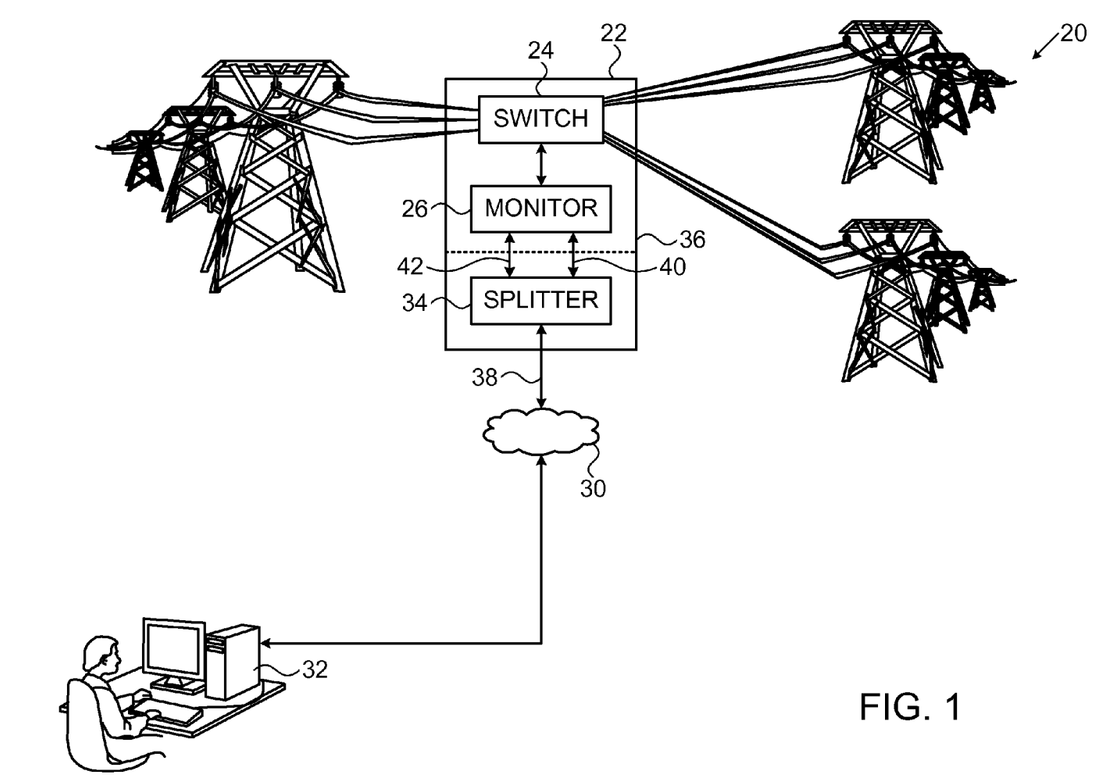
FIG. 1 is a block diagram that schematically illustrates a system for monitoring and control of a secure facility, in accordance with an embodiment of the present invention.

FIG. 1 is a block diagram that schematically illustrates a system 20 for secure monitoring and control, in accordance with an embodiment of the present invention. In this example, system 20 is used to monitor and control an industrial control system in a utility control station 22, such as a transmission and switching station of an electric power utility. Although for the sake of simplicity, only a single station 22 is shown in FIG. 1, in practice utilities generally operate many such stations. Station 22 typically comprises operational elements, such as switches 24, which make and break power connections. In many actual systems, stations 22 are unmanned, and switches are controlled remotely by command transmission stations, such as a control terminal 32, for example. Terminal 32 communicates with station 22 via a network 30, which may comprise any suitable wired or wireless network, or a combination of such networks, including public networks, such as the Internet.

In a typical scenario, terminal 32 may be part of an electrical sector balancing authority control center. Such control centers routinely exchange information with utilities in the balancing authority's geography using the Inter-Control-Center Communication Protocol (ICCP). Utilities, such as station 22, send the balancing authority status information several times per minute, describing the size and status of electric loads, of electric generators, and of electric transmission lines. The balancing authority routinely sends commands back to these utilities again using the ICCP protocol, commands indicating that the utilities should produce more power, or less power, or increase or reduce power flows across certain transmission lines.

Although the pictured example relates, by way of illustration, to an electric power utility, the principles of the present invention are not limited to this particular operating context. Rather, the apparatus and methods that are described below may be applied to utilities of other types (such as gas or water utilities, for instance), as well as in industrial environments and substantially any other application in which tight control is to be exercised over commands that may be input to a protected facility. Station 22 is just one example of such a facility, which is presented here for the sake of clarity of explanation. Although certain embodiments of the present invention are described hereinbelow, without limitation, with respect to the elements of system 20, the principles of these embodiments and the techniques that they incorporate may similarly be applied in other operating environments in which a facility is to be protected from undesired data input and unauthorized access.

For example, pumping stations on oil pipelines often communicate with a central SCADA system using the bi-directional Modbus® communications protocol. The SCADA system routinely gathers status information from the pumping station via the Modbus protocol, and occasionally sends commands to the substation, such as "open a valve" or "turn on a pump."

As another example, a chemical plant may routinely send data from plant systems out to corporate applications and users, describing equipment usage, spare parts needs and other status information, while occasionally requiring command inputs from those corporate networks in the form of control recipes. Control recipes describe which chemical products and quantities the business needs the plant to manufacture next in order to meet changing customer orders.

Returning now to FIG. 1, station 22 is typically designed as a closed, secure facility, protected physically against unauthorized entry. A monitor 26, within a protected network 36 in station 22, inputs commands to switches 24 and monitors the operation of the switches and other components of the station. Typically, monitor 26 comprises a controller, which is connected to multiple sensors and actuators, which are distributed throughout station 22 and report via the secure internal network to the controller, as described, for example, in the above-mentioned U.S. Pat. No. 7,649,452. Monitor 26 serves as a communication node to output status information collected from the sensors and actuators and to receive commands from network 30.

Monitor 26 in station 22 receives and transmits messages from and to network 30 via a protocol splitter 34, whose structure and operation are described further hereinbelow. Splitter 34 communicates with network 30 via a bi-directional link, and thus transmits and receives messages to and from terminal 32. The splitter conveys incoming commands to monitor 26 via an inbound one-way connection 40 and receives outgoing status information and other messages from monitor 26 via an outbound one-way connection 42. Monitor 26 typically receives no inputs from network 30 or any other external network other than via splitter 34, which is typically contained in station and is thus itself protected from physical and electrical tampering.

As explained earlier, terminal 32 communicates with monitor 26 using a predefined communication protocol, such as ICCP, Modbus, IEC 60870-5 (or other SCADA-compatible protocols), or DNP3 (the Distributed Network Protocol, used between components in process automation systems). Each of these protocols defines certain commands, queries, responses, and status information message formats. Splitter 34 is designed and/or programmed to recognize the protocol or protocols supported by monitor 26, to terminate messages (i.e., to serve as a protocol endpoint) transmitted between terminal 32 and monitor 26, and to pass through or block different message types in accordance with predefined message handling logic, as described further hereinbelow.

Figure 2:
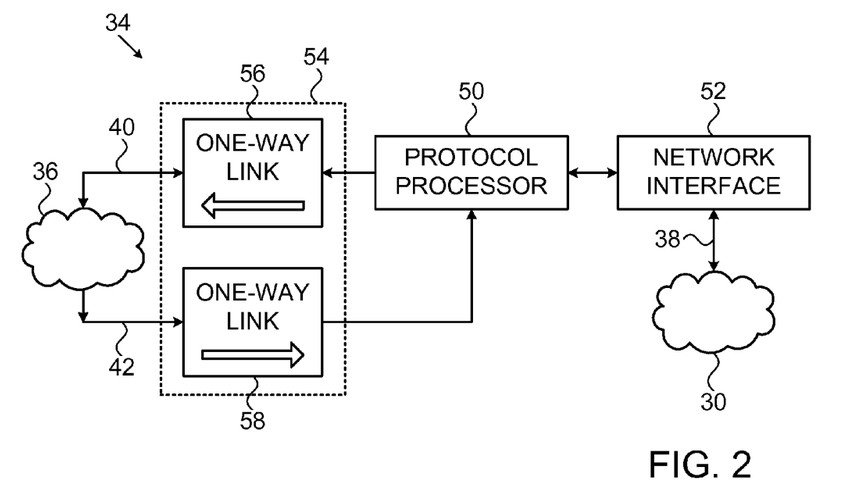
FIG. 2 is a block diagram that schematically shows elements of a protocol splitter, in accordance with an embodiment of the present invention.

FIG. 2 is a block diagram that schematically shows details of protocol splitter 34, in accordance with an embodiment of the present invention. Splitter 34 comprises a protocol processor 50 with interfaces 52 and 54 to public network 30 and to protected network 36, respectively. Processor 50 may comprise a general-purpose programmable microprocessor, which is programmed in software to carry out the processing functions described herein. This software may be stored in non-transitory, computer-readable media, such as optical, magnetic, or electronic memory media. Alternatively or additionally, at least some of the functions of processor 50 may be implemented in hard-wired or programmable logic.

Interface 54 comprises at least a pair of hardware-enforced unidirectional channels: an inbound hardware-enforced unidirectional channel 56, which conveys communications only from processor 50 to protected network 36, and an outbound hardware-enforced unidirectional channel 58, which conveys communications only from protected network 36 to processor 50. Channels 56 and 58 (referred to in the figure, for the sake of brevity, as one-way links) are typically configured in hardware to be physically capable of transmitting data only in a single direction. Such channels may comprise, for example, Unidirectional Security Gateways produced by Waterfall Security Solutions Ltd., as mentioned above. Optionally, interface 54 may comprise two (or more) redundant parallel channels in each direction, inbound and outbound, and may transmit data over both channels in parallel in order to ensure reliable reception.

Although splitter 34 is shown and described here as comprising a single processor 50, with one interface 52 or to each of networks 30 and 36, respectively, in alternative embodiments (not shown in the figures), the splitter may comprise multiple processors, which may be coupled to multiple interfaces on either or both of the "public" and "protected" sides of the splitter. In other alternative embodiments (not shown in the figures), some or all of the functions of protocol processor 50, a receive agent 66, and/or a transmit agent 60 (both shown in FIG. 3) may be implemented in the same processor.

Figure 3:
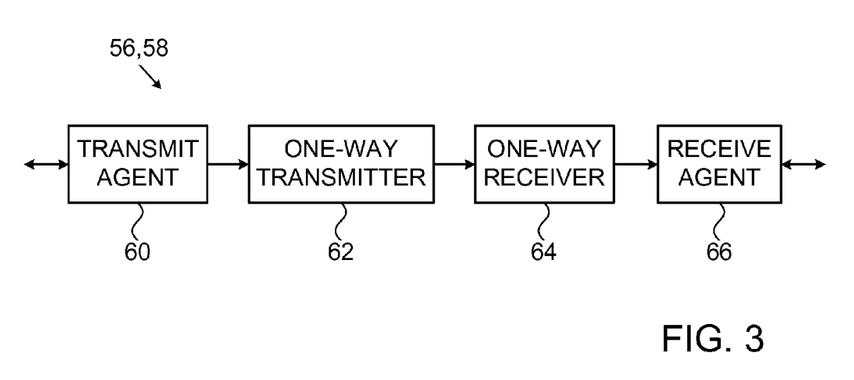
FIG. 3 is a block diagram that schematically shows elements of a hardware-enforced unidirectional channel used in a protocol splitter, in accordance with an embodiment of the present invention.

FIG. 3 is a block diagram that schematically shows elements of hardware-enforced unidirectional channels 56, used in protocol splitter 34, in accordance with an embodiment of the present invention. A transmit agent 60, typically implemented in software on a host processor, receives incoming communications and converts the communications into an appropriate data format for transmission by a one-way transmitter 62. The conversion may involve modifying the incoming communications, or extracting or deriving certain information from the incoming communications, discarding the incoming communications, and forwarding some or all of the transformed communications or extracted information to one-way transmitter 62. Transmitter 62 typically comprises a fiberoptic transmitter, which transmits the communications over a short fiberoptic cable to a receiver 64. As channels 56 and 58 each comprise only the single transmitter 62 at one end of the fiberoptic cable and the single receiver 64 at the other end, the channels are physically capable of carrying communications only in the single, designated direction for which they are configured. A receive agent 66, also typically implemented in software, receives the data from receiver 64 and converts the data into the appropriate (typically standard) communication format for output. Transmit agent 60 and receive agent 66 may run on the same processor or (for greater security) on separate processors.

Figure 4:
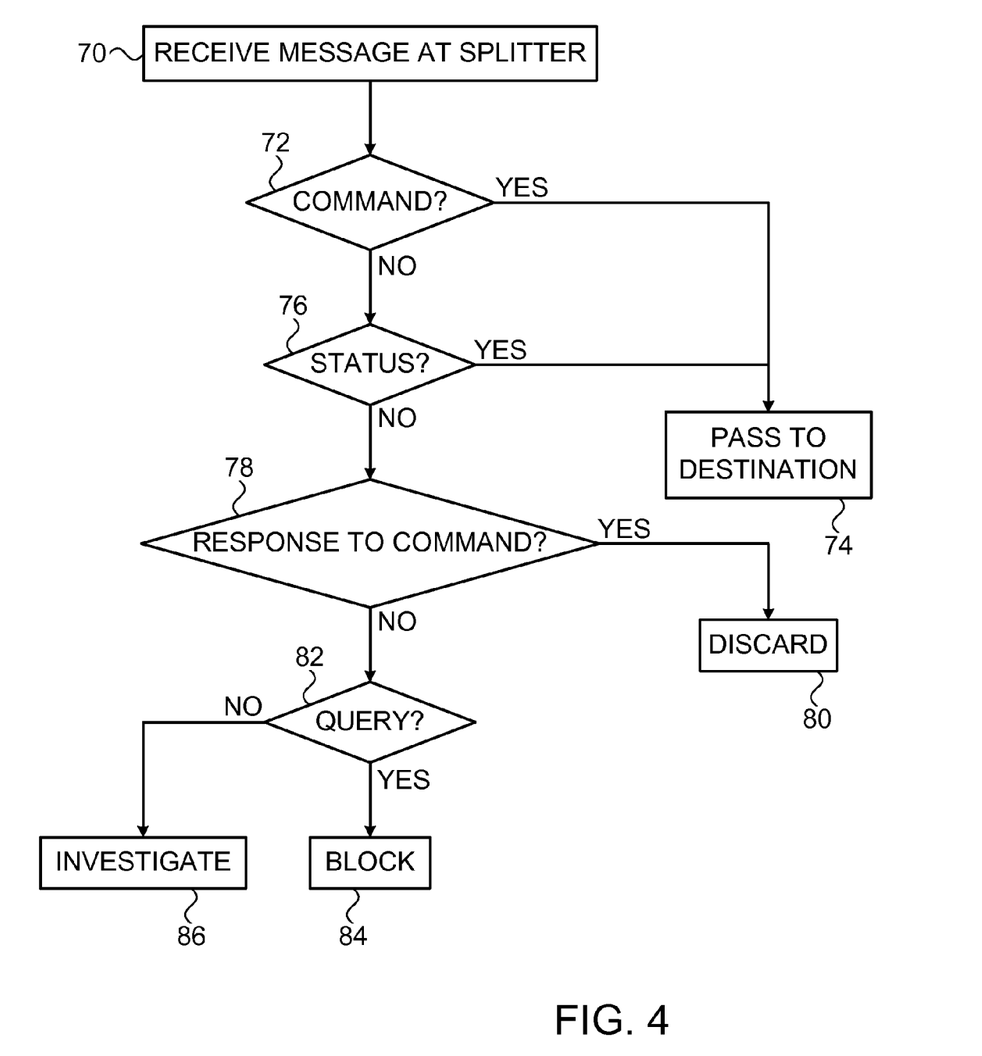
FIG. 4 is a flow chart that schematically illustrates a method for message handling, in accordance with an embodiment of the present invention.

FIG. 4 is a flow chart that schematically illustrates a method for message handling carried out by protocol splitter 34, in accordance with an embodiment of the present invention. The method is described here, for the sake of clarity, with reference to the system and hardware configurations that are shown in FIGS. 1 and 2, but the principles of the method may similarly be implemented for secure communications in other configurations.

The method of FIG. 4 is initiated when splitter 34 receives a message, via either of interfaces 52 and 54, at a message reception step 70. The message typically has the form of a data packet, containing the message as its payload, in accordance with a predefined, known protocol format. Processor 50 analyzes the format to determine the message type and handles the message accordingly. For the sake of clarity, the message handling logic is presented in FIG. 4 as a serial progression among different message types, each triggering its own decision, but in practice, some or all of the decision components may be handled in a single step.

Processor 50 checks whether the message comprises a command, at a command checking step 72. If so, splitter 34 passes the message contents through to its destination via transmit agent 60 of hardware-enforced unidirectional channel 56, at a message transmission step 74. Otherwise, the processor checks whether the message contains status information, typically concerning a given condition or event, at a status checking step 76, and if so, likewise passes the message contents through at step 74.

Processor 50 may pass the message contents at step 74 in a number of different ways:
The processor may simply forward the original messages.
The processor may forward only the data contents of the messages, such as the payloads.
The processor may forward the message semantics, i.e., it may, for example, extract the meaning of the messages, represent that meaning in appropriate data structures, serialize the data structures, and then send those serialized data structures over channel 56.

References in the present description and in the claims to conveying a command or information between nodes should be understood as encompassing any and all of these different ways of passing message contents.

If the message is neither a command nor a status message, processor 50 checks whether the message contains a response to a command, at a response checking step 78. If so, the processor discards the message, at a discard step 80, although the processor may optionally process the message before discarding it.

Otherwise, the processor checks whether the message comprises a query, at a query checking step 82. If so, splitter 34 blocks the query, at a blocking step 84. Blocking the query may take different forms in different contexts. For example, upon receiving a query from network 30 via interface 52, processor 50 may return a response rejecting the query, also via interface 52, to the sender of the message. On the other hand, upon receiving a query from protected network 36, processor 50 may simply discard the query without response.

When the received message does not belong to any of the recognized types, processor 50 may discard the message, or it may pass it on to a human or automated supervisor for further evaluation, at an investigation step 86. Alternatively or additionally, the processor may reject the message by issuing a rejection message to the sender of the message. In general, splitter 34 will be programmed and configured to pass only recognized message types through between the protected and public networks.

Figure 5:
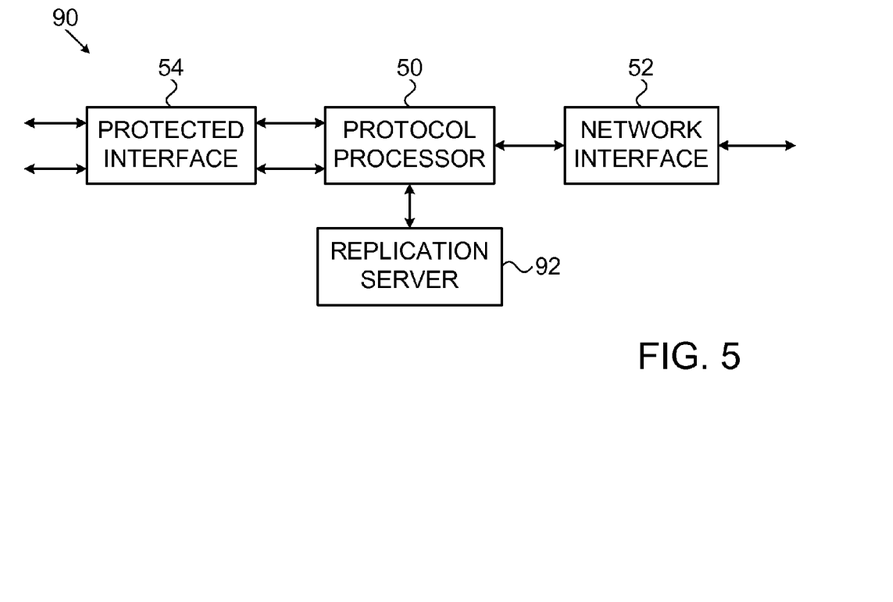
FIG. 5 is a block diagram that schematically shows elements of a protocol splitter, in accordance with another embodiment of the present invention.

FIG. 5 is a block diagram that schematically shows elements of a protocol splitter 90, in accordance with another embodiment of the present invention. This embodiment addresses the problem that not all communications protocols can be effectively divided by splitter 34 alone. For example, the ODBC (Open Database Connectivity) protocol, which is commonly used to query relational databases, is fundamentally oriented towards commands/queries and their responses. Therefore, the ODBC protocol cannot be meaningfully supported by a splitter that simply discards all responses to commands and queries.

Therefore, in addition to communicating via interfaces and 54, protocol processor 50 in splitter 90 communicates with a replication server 92. This server 92 receives and maintains a replica of data transmitted by monitor 26 within network 36, via interface 54, to processor 50. Server 92 uses the replicated data to respond to queries from network 30 with respect to the data. Thus, in splitter 90, processor 50 continues to block queries directed from network 30 to protected network 36; but rather than rejecting or discarding these queries, processor 50 forwards the queries to replication server 92. The replication server generates appropriate responses, based on the replicated data, and processor 50 forwards these responses via interface 52 to the requesters on network 30.

Figure 6:
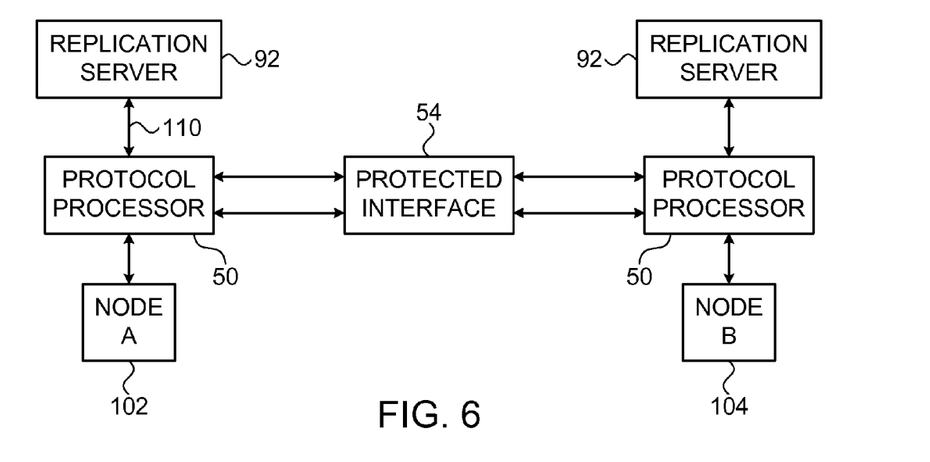
FIG. 6 is a block diagram that schematically illustrates a system comprising a pair of protocol splitters, in accordance with an embodiment of the present invention.

FIG. 6 is a block diagram that schematically illustrates a system 100 comprising a pair of protocol splitters 106, 108, in accordance with a further embodiment of the present invention. In this system, splitter 106 is connected to transmit and receive digital communications to and from one endpoint node 102 (labeled NODE A), while splitter 108 is connected to transmit and receive digital communications to and from another endpoint node 104 (labeled NODE B). Communications between each of the splitters and the respective endpoint node may be carried over a respective bidirectional link 110. On the other hand, protocol splitters 106 and 108 are themselves interconnected by a hardware-enforced unidirectional channel 112 from splitter 106 to splitter 108, and a second hardware-enforced unidirectional channel 114 from splitter 108 to splitter 106.

Thus, in this configuration, splitters 106 and 108 serve not only as protocol splitters, but also as protocol combiners, enabling nodes 102 and 104 to communicate as though they were connected by a bidirectional channel. Splitters 106 and 108, however, handle and filter protocol traffic in a manner similar to that described above. The combined operation of splitters 106 and 108 in system 100 can thus be useful in frustrating attempts by attackers to exploit protocol communications between nodes 102 and 104 for unintended, malicious purposes. Optionally, one or both of splitters may be connected to a replication server, like server 92 in the preceding embodiment.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Communication apparatus, comprising:
  at least one first communication interface, configured for digital communication with a first node;
  at least one second communication interface, configured for digital communication with a second node; and
  at least one processor, which is coupled between the at least one first communication interface and the at least one second communication interface, and which is configured, upon receiving a message from one of the first and second nodes that is directed to the other of the first and second nodes, to carry out the following actions:
    when the message contains a command, to convey the command to the other of the first and second nodes;
    when the message contains status information, to convey the status information to the other of the first and second nodes;
    when the message contains a response to a command, to discard the response; and
    when the message contains a query, to block the query from reaching the other of the first and second nodes.

2. The apparatus according to claim 1, wherein the first node is contained in a protected network, and wherein the at least one processor is configured, upon receiving the query from the second node, to convey a response to the second node rejecting the query.

3. The apparatus according to claim 1, wherein the at least one first communication interface comprises a first hardware-enforced unidirectional channel from the at least one processor to the first node and a second hardware-enforced unidirectional channel from the first node to the at least one processor.

4. The apparatus according to claim 1, and comprising a replication server, which is coupled to the at least one processor and is configured to receive and maintain a replica of data transmitted by the first node via the at least one first communication interface and using the replica, to respond to queries with respect to the data,
  wherein the at least one processor is configured, upon receiving queries directed to the first node from the second node, to forward the queries to the replication server and to forward responses to the queries from the replication server to the second node.

5. The apparatus according to claim 1, wherein the processor is configured, when the message contains a response to a command, to process the response before discarding the response.

6. A system for secure communication between first and second nodes, the system comprising:
  first and second protocol splitters, each of the protocol splitters configured to transmit and receive digital communications to and from a respective one of the first and second nodes;
  a first hardware-enforced unidirectional channel from the first protocol splitter to the second protocol splitter; and
  a second hardware-enforced unidirectional channel from the second protocol splitter to the first protocol splitter.

7. The system according to claim 6, wherein each of the protocol splitters is configured, upon receiving a message from the respective one of the nodes, to carry out the following actions:
  when the message contains a command, to convey the command to the other of the protocol splitters;
  when the message contains status information, to convey the status information to the other of the protocol splitters;
  when the message contains a response to a command, to discard the response; and
  when the message contains a query, to block the query.

8. The system according to claim 7, wherein each of the protocol splitters is configured, when the message contains a response to a command, to process the response before discarding the response.

9. The system according to claim 6, and comprising at least one replication server, which is coupled at least to the first protocol splitter and is configured to receive and maintain a replica of data transmitted by the second node via the second protocol splitter and using the replica, to respond to queries from the first node with respect to the data,
  wherein the first protocol splitter is configured, upon receiving queries directed to the second node from the first node, to forward the queries to the replication server and to forward responses to the queries from the replication server to the first node.

10. The system according to claim 9, wherein the at least one replication server comprises a first replication server coupled to the first protocol splitter and a second replication server coupled to the second protocol splitter.

11. A method for communication, comprising:
  coupling a protocol splitter into a communication path between a first node and a second node; and
  upon receiving a message at the protocol splitter from one of the first and second nodes that is directed to the other of the first and second nodes, carrying out the following actions:
    when the message contains a command, conveying the command to the other of the first and second nodes;
    when the message contains status information, conveying the status information to the other of the first and second nodes;
    when the message contains a response to a command, discarding the response; and when the message contains a query, blocking the query from reaching the other of the first and second nodes.

12. The method according to claim 11, and comprising, when the message contains a response to a command, processing the response before discarding the response.

13. The method according to claim 11, wherein the first node is contained in a protected network, and wherein blocking the query comprises, upon receiving the query from the second node, conveying a response to the second node rejecting the query.

14. The method according to claim 11, wherein coupling the protocol splitter comprises conveying communications over a first hardware-enforced unidirectional channel from the protocol splitter to the first node and over a second hardware-enforced unidirectional channel from the first node to the protocol splitter.

15. The method according to claim 11, and comprising coupling a replication server to receive and maintain a replica of data transmitted by the first node via the protocol splitter and using the replica, to respond to queries with respect to the data,
wherein blocking the query comprises, upon receiving a query directed to the first node from the second node, forwarding the query from the protocol splitter to the replication server and forwarding a response to the query from the replication server via the protocol splitter to the second node.

16. The method according to claim 11, wherein coupling the protocol splitter comprises coupling first and second protocol splitters into the communication path between the first node and the second node, while connecting a first hardware-enforced unidirectional channel from the first protocol splitter to the second protocol splitter and a second hardware-enforced unidirectional channel from the second protocol splitter to the first protocol splitter.

* * * * *